United States Patent

[11] 3,577,064

| [72] | Inventor | Sarkis Nercessian<br>Long Island City, N.Y. |
|---|---|---|
| [21] | Appl. No. | 806,385 |
| [22] | Filed | Mar. 12, 1969 |
| [45] | Patented | May 4, 1971 |
| [73] | Assignee | Forbro Design Corp.<br>New York, N.Y. |

[54] AUTOMATIC ERROR DETECTION AND INDICATION IN A REMOTELY PROGRAMMABLE REGULATED POWER SUPPLY
12 Claims, 2 Drawing Figs.

[52] U.S. Cl. ............................................. 232/20,
323/22, 324/76, 340/248
[51] Int. Cl. .............................................. G05f 1/58
[50] Field of Search........................................ 323/22
(TSCR), 20, (Termatrex), (4, 9, 16—22); 317/33;
340/227—252, 248; 324/(Saw RVR); 320/48

[56] References Cited
UNITED STATES PATENTS

| 3,138,752 | 6/1964 | De Blasio | 323/22(T) |
|---|---|---|---|
| 3,196,343 | 7/1965 | Griffin | 323/22(T) |
| 3,225,257 | 12/1965 | Fegley | 317/33 |
| 3,241,046 | 3/1966 | McVey | 323/22(T) |
| 3,304,490 | 2/1967 | Dubin et al. | 340/248X |
| 3,378,829 | 4/1968 | Alafi et al. | 340/227X |
| 3,399,339 | 8/1968 | Yeager | 323/22(T) |
| 3,449,737 | 6/1969 | Stewart | 340/248 |
| 3,479,575 | 11/1969 | Wright et al. | 320/48 |
| 3,480,852 | 11/1969 | Han-Min Hung | 323/20X |

*Primary Examiner*—J. D. Miller
*Assistant Examiner*—Gerald Goldberg
*Attorney*—Alfred W. Barber

ABSTRACT: A programmable regulated power supply includes internal control circuits for determining the output voltage and digital visual read-out indicators showing the output voltage called for by the control circuits. In the operation of this power supply there are a number of predetermined circuit conditions which may result in the actual output voltage being different from the called for voltage. These conditions are detected and indicated individually and collectively. Certain of these conditions when detected serve to also extinguish the visual indicators.

INVENTOR.
SARKIS NERCESSIAN
BY
*Alfred W. Barber*
ATTORNEY

3,577,064

AUTOMATIC ERROR DETECTION AND INDICATION IN A REMOTELY PROGRAMMABLE REGULATED POWER SUPPLY

DESCRIPTION OF THE PRIOR ART

A large group of programmable regulated power supplies has been created based on the "bridge" or the "operational power supply" concept the basic concepts of which are shown in FIGS. 3.1 and 3.2 on page 31 of the Kepco Power Supply Handbook copyright 1965 and described on page 31 and following pages. The output of these power supplies is equal to a reference voltage multiplied by a factor from zero to one which will produce the maximum rated output of the power supply. The multiplication factor is equal to the ratio of an output voltage control resistor connected from the output to the input divided by the resistor connected between the reference voltage and the input. Thus, the output can be controlled by changing the reference voltage, the input resistor or the feedback resistor.

A programmable regulated power supply in which both the input resistor and the feedback resistor are varied to program the output over a wide range is shown and described in the copending application entitled "Method of and Means for Digital Programming of Regulated Power Supplies" filed Oct. 1, 1968 and bearing Ser. No. 764,083. In the programmable power supply described in the above-referenced application the feedback or voltage control resistor is switched according to a digital program and the input resistor is switched to multiply the output by factors of 10. The present invention will be described in connection with a basic programmable power supply of the general type described in the referenced application although certain features of the present invention are generally applicable to other types of regulated power supplies.

SUMMARY

The present invention provides a number of improvements which have particular significance for programmable power supplies and especially for those in which the voltage control resistor is switched and in which there are provisions for programming with external control means. The output voltage of the power supply is programmed by switching the voltage control resistor for fine increments in voltage and the input resistor for multiplying the range of the output by factors of 10. Since the output voltage of the power supply is settable in extremely fine increments and since it is desirable to know the output voltage accurately, the usual moving coil meters are far too coarse in indication and precision digital voltmeters are relatively expensive. In accordance with the present invention, output voltage is precisely indicated by means of numerical indicators coupled to the voltage control switches. Thus, when, for example, the voltage control switches are set for an output voltage of 12.35 volts, indicator lamps light up reading 12.35 volts. Since the power supply is extremely well regulated and carefully calibrated, the output voltage, under normal operating conditions, will actually be the voltage programmed and the voltage shown by the indicators. However, there are circumstances and conditions under which the indicated voltage may not be the true output voltage. The purpose of the present invention is to sense such conditions, to indicate that such conditions exist and to indicate the nature of the fault or error condition.

In addition to the switch controlled programming of the power supply described above, the present invention contemplates remote programming in which the input and voltage control resistors are switched externally. Under remote programming conditions, the output voltage indicator lamps are also switched externally. Additional improper operational conditions are provided for and indicated for the remote programming condition.

The error conditions indicated and provided for under local switch control conditions are as follows:

1. One or more voltage selector switch on "Remote" while others on voltage settings. Error light is turned on and indicator lights are turned off.
2. Output voltage control transistors over allowable temperature. Error light is turned on the indicator lights are turned off, and the output circuit of the control amplifier driving the control transistors is opened. An additional lamp indicating "Overtemperature" may also be turned on.
3. Output current above the maximum rating of the power supply. Error light is turned on and output voltage indicators are turned off. An additional lamp indicating "Overcurrent" may also be turned on.
4. Overvoltage across the output, that is a voltage exceeding the rating of the power supply. Error light is turned on and voltage indicator lamps are turned off. An additional lamp indicating "Overvoltage" may also be turned on.

Under remote programming conditions, the same error provisions as described in 2, 3 and 4 above are continued in effect. In addition an undervoltage error detection and additional indicator is provided. If the remote programming circuit applies the wrong polarity of reference voltage to the power supply, the output reverses by a small amount. This reversed output is detected and the "Undervoltage" error indicator is turned on. An additional indicator labeled "undervoltage" may also be provided.

BRIEF DESCRIPTION OF THE DRAWING

In FIG. 1 essential components of the programmable voltage regulated power supply comprise a control amplifier 1 including an input terminal 12, an output terminal 76 and a common terminal 11. This control amplifier drives a current control or pass transistor 2 having a base 3, collector 4 and emitter 5. The output terminal 76 of amplifier 1 is connected to base 3 through a cutout switch 74 operated by relay 73. Pass transistor 2 is connected in circuit with a suitable source of unregulated voltage, here represented by battery 6. The regulated output voltage appears between negative terminal 8 connected over lead 7 to the negative end of voltage source 6 and positive terminal 9 connected over common lead 10 and through current-sensing resistor 77 to emitter 5 of pass transistor 2. In order to complete the circuit of the regulated power supply a reference voltage source, an input resistor and a voltage control resistor are required. The reference voltage is taken from a suitable source such as across Zener diode 19 supplied with current through dropping resistor 18 from a suitable voltage source here represented by battery 17. The input resistor is one of range multiplier resistors 20, 21 or 22 selected by switch 23 through 31 and applying an input current at junction 14 and through switch 13 to amplifier input terminal 12. The input resistors may apply currents of 0.1 ma., 1 ma. or 10 ma. to the amplifier depending on which of the switches 23 through 31 is in the upper position. In order to maintain the current through the reference voltage Zener diode constant, the other two switches in each case are closed to the down position thereby drawing current through the associated resistors over lead 33 and through switch 34 to common lead 10 and the return point of the Zener diode. The voltage control resistor is a switch-controlled resistor connected between the "high" output terminal 8 and amplifier input 12 at junction point 14 also through switch 13. The switch-controlled voltage control resistor is here represented in greatly simplified form in order to clarify the operation of the invention. In actual practice the voltage control switch and associated resistors may form a wide range of switch-resistor combination providing resistor values over a 100—1 range in steps of 0.01. However, the functions to be illustrated can be adequately described in connection with the simplified showing. The voltage control resistor includes resistors 42, 43 and 44 connected in series and selected by switch 36 through 39. The output voltage programmed in this way is equal to the resistance value of the selected resistor or resistors in series, divided by the resistance value of the selected input resistor (one of resistors 20, 21 or 22) and the ratio multiplied by the reference voltage across Zener diode 19. Coupled to switch arm 36 is an indicator lamp switch arm 45 which energizes one of indicator lamps 50, 51 or 52 from a suitable source of power, here represented by battery 53, over lines 54 and 55 and through cutout switch 56 actuated by relay 57. Thus, if switch arm 36 is on contact 38 and the output voltage programmed by resistors 42 and 43 in series together with the reference voltage and selected input resistor is 2 volts, switch arm 45 which is automatically closed to contact 47 energizes lamp 51 which reads 2 volts. If there are no error conditions as will be described below, the output voltage between output terminals 8 and 9 will also be 2 volts. The above, then, briefly describes the essential operation of the power supply under local programming conditions.

Figure 1:
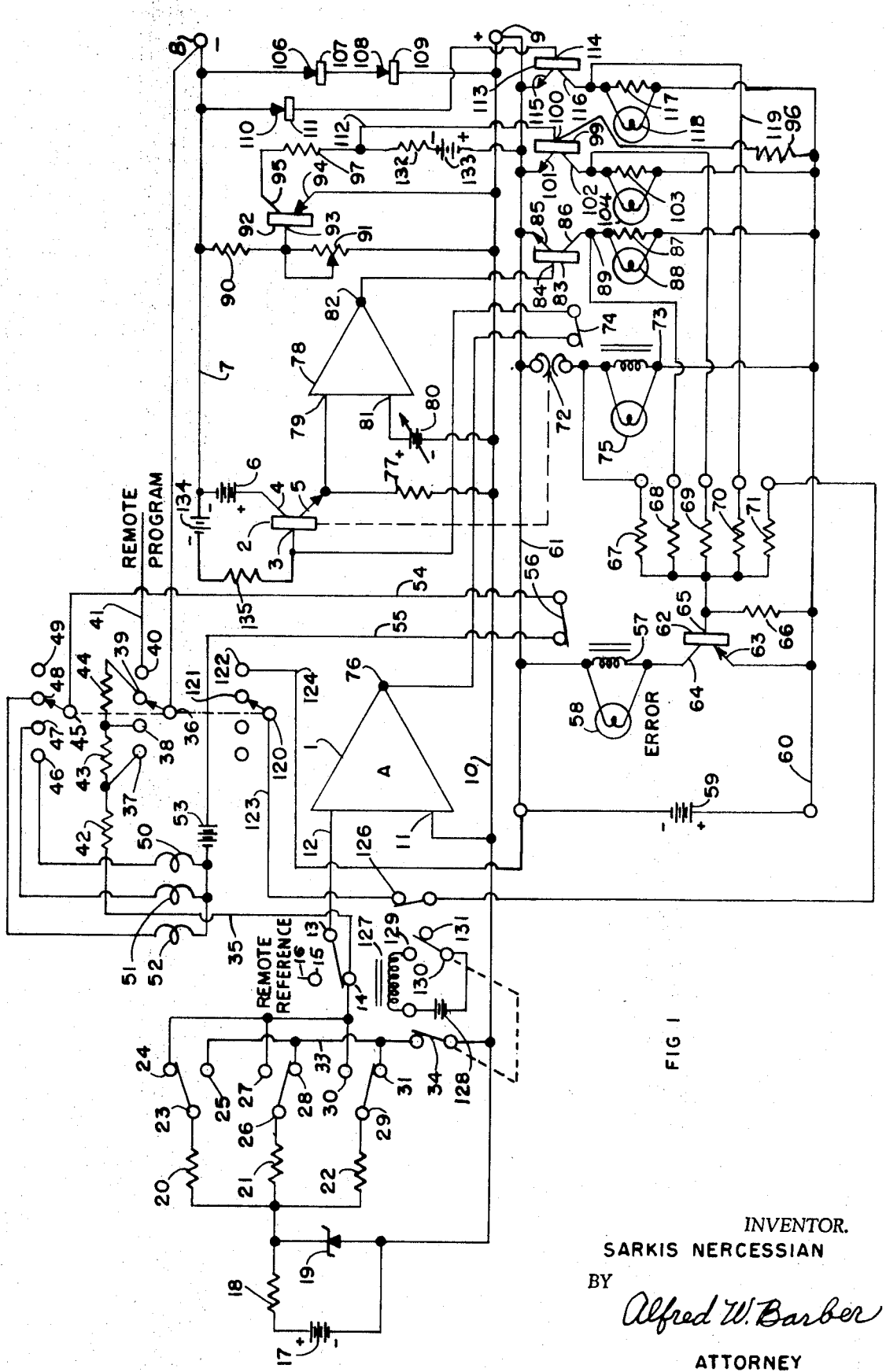
FIG. 1 is a detailed schematic circuit diagram of the preferred embodiment of the invention.

The first error condition to be described is the one enumerated in paragraph 1 above, namely that which pertains if one of the voltage selector switches is set on "Remote" rather than on a specific voltage setting. The voltage control switches are provided with voltage control connections except in one position designated for remote control operation. A portion of additional switch 120 through 122 ganged to switches 45 through 49 and 36 through 40 is also shown. When these latter two switches are set to close contacts 45—49 and 36—40 for remote programming, the power supply may be out-of-control but switch contacts 120—122 will also be closed. This completes a circuit between one end of resistor 71 and common line 61. Bus 60 is maintained at a positive potential with respect to line 61 returned to common terminal 9 by means of a suitable source of potential here represented by battery 59. Transistor 62 having a base 65, emitter 63 and collector 64 is bridged between common bus 61 and positive bus 60 through relay coil 57. Base 65 is returned to positive bus 60 through resistor 66 so that transistor 62 is normally nonconducting and passes no current through relay coil 57. Now, when line 123 is connected back to common line 61 through switch 120—122 as described above, a forward bias current is applied through resistor 71 to base 65 and transistor 65 becomes conducting. The resulting collector current through relay coil 57 opens switch 56 turning off the indicator lights (50, 51 or 52) and the voltage drop across coil 57 lights "ERROR" lamp 58. Lamp 58 is labeled ERROR and thus, when it lights, the operator is warned of some incorrect operation or functioning of the power supply. Also, since there is an error and the output voltage will be other than that indicated by the voltage indicator lamps, these lamps are turned off.

The second error condition provided for as stated in paragraph 2 above is overtemperature of the pass transistor 2. (The overtemperature detection and indication may be extended to other critical portions of the circuit). Thermally coupled to the pass transistor (or transistors where more than one is used) is a normally open contact thermostat 72 adjusted to close at a predetermined temperature above which it is undesirable or unsafe to operate the power supply. Thermostat 72 is connected in series with relay coil 73 and the two are bridged between common line 61 and positive bus 60. If an overtemperature condition takes place, contacts 72 close, resistor 67 is connected back to common line 61 and current is passed through relay coil 73. Returning resistor 67 to common bus 61 again turns transistor 62 on causing relay 57 to turn off the indicator lights and turn on the error indicator. Relay 73 opens switch 74 which opens the circuit between output 76 of control amplifier 1 and base 3 of pass transistor 2 so that no more drive will be applied to the pass transistor until it cools down sufficiently to open thermostat contacts 72 again. A lamp 75 designated OVERTEMPERATURE may be connected across relay coil 73 so that on overtemperature conditions, not only does the error indicator go on, the voltage indicator lights go off, and the pass transistor drive become interrupted but the nature of the fault or error is indicated and named.

The third error condition named in paragraph 3 above, is overcurrent. The output or load current of the power supply flows through current sensing resistor 77 connected between pass transistor emitter 5 and common lead 10. The voltage drop across resistor 77 is a measure of and proportional to the transport current of the power supply. If excess current, that is current above the rating of the power supply is drawn from the output terminals, the voltage drop across terminals 77 will exceed a predetermined voltage. A reference voltage source is provided, here represented by adjustable battery 80 and the voltage drop across resistor 77 is compared therewith at the input to a suitable comparison amplifier, here represented by amplifier 78, by applying the drop across resistor 77 to input 79 and the reference voltage to input terminal 81. The polarity of inputs and outputs of amplifier 78 is so chosen that a positive going output appears at output terminal 82 whenever the voltage drop across current sensing resistor 77 exceeds reference voltage 80. This positive going voltage is applied to the base 84 of transistor 83 and turns it on. Emitter 85 is returned to common lead 61 and collector 86 is connected through resistor 87 to positive bus 60. When transistor 83 is thus turned on, point 89 is pulled down to the voltage of common lead and resistor 68 connected to point 89 turns on transistor 62. Again, the error lamp is energized and the voltage indicator lamps are turned off. Also, a lamp 88 may be connected across resistor 87 designated OVERCURRENT so that when transistor 83 is turned on by an overcurrent condition, not only is error indicated but the precise nature of the trouble is spelled out.

The fourth error condition stated in paragraph 4 above is overvoltage. Overvoltage can result from a number of conditions and is detected by a circuit including transistors 92 and 99. Transistor 92 having a base 93, emitter 94 and collector 95 detects an overvoltage condition. Collector 95 has a load resistor 132 connected to a source of negative voltage 133, emitter 94 is returned to common line 10 and base 93 is connected to a voltage divider comprising resistors 90 and 91 bridged across the negative and positive lines. For convenience one of these resistors, for example, resistor 91 is made adjustable so that the potential of base 93 can be set to just cause conduction of transistor 92 when a predetermined overvoltage condition across the output terminals is reached. Transistor 99 having a base 100, an emitter 101 and a collector 102 is connected with emitter 101 to common line 61, collector 102 connected through resistor 103 to positive bus 60 and base 100 connected to the junction between resistors 97 and 96 forming a divider between collector 95 and positive line 60. The divider formed by resistors 96 and 97 and the voltages at positive line 60 and negative bias source 133 place a cutoff bias on transistor 99 when transistor 92 is nonconducting or off. However, in the presence of an overvoltage condition, transistor 92 becomes conducting sending collector 95 in a positive direction, turning transistor 99 on. When transistor 99 goes on, collector 102 drops to essentially the potential of common line 61 and resistor 69 connected to it places a turn-on bias on transistor 62. As above, the error light is turned on and the voltage indicator lights are turned off. A lamp 104 may be connected across resistor 103 labeled OVERVOLTAGE. This lamp will also go on, naming the source of the error.

The above generally covers the operation of the present invention for the local control mode. It is also intended that this power supply be programmable by remotely connected mechanite Preparation for remote programming is accomplished by closing all voltage programming switches to "remote" position, for example, arm 45 to contact 49, arm 36 to contact 40 and arm 120 to contact 122. This makes the voltage control resistance circuit available externally as over lead 41. Switch arm 13 is closed to contact 15 making the reference voltage and input resistor circuit available externally over lead 16. Arm 130 is closed to contact 129 energizing relay 127 from a suitable source of voltage, shown here as battery 128. Relay 127 opens the Zener diode loading circuit over lead 33 by opening switch 34. Relay 127 opens switch 126 opening the error circuit for indicating incorrect switch positions since it is no longer pertinent. A lamp marked REMOTE (not shown) may be connected across relay 127 to show that the power supply is adapted to remote programming. The overtemperature, overcurrent and overvoltage error circuits remain connected and function as described above.

In the remote programming condition an additional error circuit is provided. This is an undervoltage circuit. If the reference voltage polarity is reversed from the normal mode, the output voltage of the power supply will reverse polarity while the operator may otherwise under the impression that he should be getting certain programmed voltages out of the power supply. Reverse output voltage is detected by a circuit using diodes 106 through 111 connected across the output terminals. In the normal output mode these diodes are all reverse biassed and hence nonconducting. If, however, the polarity of the output is reversed, these diodes are all forward biassed and conducting. Diodes 106—107 and 108—109 in series limit the output voltage to about 1.2 volts (twice the conduction voltage of silicon diodes) and prevents harmful reverse voltages from appearing across the output terminals. Diode 110—111 is connected with anode 110 connected to negative line 7 and cathode 111 connected to base 114 of transistor 113. Emitter 115 is returned to common line 61 and collector 116 connected through resistor 117 to positive bus 60. Under reverse polarity conditions, current flows through diode 110—111 turning on transistor 113 (the drop across the two diodes 106—107 and 108—109 is sufficient to provide forward conduction in diode 110—111 and turn-on voltage to transistor 113). When transistor 113 is thus rendered conducting, the voltage on lead 119 is pulled down to a voltage close to that of common line 61, the circuit through resistor 70 turns on error indicating transistor 62 and error lamp 58 is turned on. A lamp 118 labeled UNDERVOLTAGE may be connected across resistor 117 so that under the undervoltage error condition, the nature of the fault or error is designated.

Thus, there has been shown and described a fault or error detecting and indicating system for regulated power supplies in which a plurality of faults or errors are collectively indicated and protective measures instituted and also individual and specific indications have been provided spelling out and naming the particular fault or error involved. While these faults or errors as described include switching errors, overtemperature, overcurrent, overvoltage and undervoltage they may readily be extended to include other specific or general faults or errors in regulated power supplies and the like.

In the overtemperature error condition, the link between the output of amplifier 1 and the base 3 of pass transistor 2 is broken by the opening of switch 74. It is desirable to provide a back-bias to base 3 as that provided by a suitable voltage source represented by battery 134 in series with resistor 135 connected between negative line 7 and base 3.

The error circuit transistor 62 receives a plurality of inputs at its base 65 to turn it on under various error conditions as set forth above. The application of these signals to the base 65 to turn on transistor 62 through resistors 67, 68, 69, 70 or 71 represent what may be called an OR gate. In other words the signal to resistor 67, "or" the signal to resistor 68, "or" the signal to resistor 69 and so on will turn on the gate (transistor 62) operating relay 57 and lighting error lamp 58.

Figure 2:
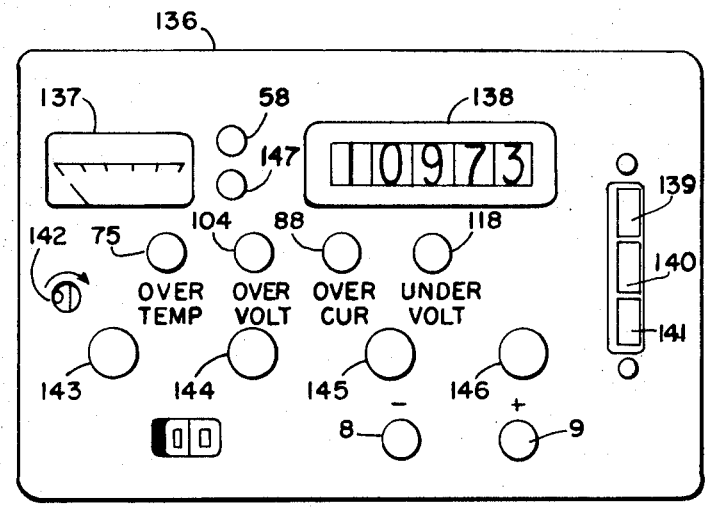
FIG. 2 is a line drawing of the front panel of a power supply embodying the invention.

FIG. 2 is a line drawing of the front panel of a power supply in accordance with the invention. Panel 136 carries a current meter 137 (not shown in FIG. 1), voltage indicators 138 (corresponding with lamps 50, 51 and 52 of FIG. 1), voltage range multiplier switches 139, 140 and 141 (corresponding with switches 23 through 31 of FIG. 1), output terminals 8 and 9, voltage control switches 143, 144, 145 and 146 (corresponding with switches 37 through 40 and 120 through 122 of FIG. 1), current limiting adjustment 142 (corresponding with adjustable current reference 80 of FIG. 1), error lamp 58, remote lamp 147 (not shown on FIG. 1 but connected across relay 127), overtemperature lamp 75, overvoltage lamp 104, overcurrent lamp 88 and undervoltage lamp 118. While the indicators are shown as filament lamps, any suitable visual indicator may be used to signal the various error conditions.

I claim:
1. In a regulated power supply, error-indicating means including the combination of;
   a source of voltage to be regulated;
   a pair of output terminals;
   a series circuit including said terminals, said source of voltage and a pass transistor;
   means including means for controlling said pass transistor for programming the voltage across said terminals;
   means for digitally indicating the terminal voltage called for by said programming means;
   and a visual error-indicator means for indicating predetermined circuit conditions which tend to prevent said terminal voltage from attaining the voltage called for by said programming means.
2. Regulated power supply error-indicating means as set forth in claim 1;
   wherein one of said predetermined circuit conditions is overtemperature of said pass transistor.
3. Regulated power supply error-indicating means as set forth in claim 1;
   wherein one of said predetermined circuit conditions is excessive current flowing to said output terminals.
4. Regulated power supply error-indicating means as set forth in claim 1;
   an OR gate coupled to said error-indicating means;
   and a plurality of circuits coupled to said OR gate responsive to said predetermined circuit conditions.
5. Regulated power supply error-indicating means as set forth in claim 4;
   and including individual visual indicators designating said predetermined circuit conditions.
6. Regulated power supply error-indicating means as set forth in claim 1;
   means for energizing said voltage indicating means to provide an illuminated display;
   and means for interrupting said energizing means responsive to said predetermined circuit conditions for extinguishing said illumination.
7. Regulated power supply error-indicating means as set forth in claim 1;
   wherein one of said predetermined circuit conditions is uncalled for voltage across said output terminals.
8. Regulated power supply error-indicating means as set forth in claim 1;
   wherein one of said predetermined circuit conditions is reverse voltage across said output terminals.
9. Regulated power supply error-indicating means as set forth in claim 1;
   wherein one of said predetermined circuit conditions is improper programming of said terminal voltage.
10. In an error prevention and indicating system, the combination of;
    a resistance feedback voltage regulated power supply comprising:
       a source of reference voltage including a Zener diode, a plurality of reference resistors, a control amplifier, at least one pass transistor, a voltage control feedback resistor, a pair of output terminals and a source of voltage to be regulated;
    means for detecting a plurality of abnormal operating conditions in said power supply;
    and means including an OR gate for visually indicating said abnormal operating conditions.
11. An error prevention and indicating system as set forth in claim 10;

wherein said detecting means includes a normally nonconducting transistor including a base, a collector and an emitter;

and wherein said visual-indicating means is coupled to said collector for indicating a conductive condition of said transistor;

and wherein said base is connected by an OR gate means to a plurality of abnormal operating conditions of said power supply.

12. An error prevention and indicating system as set forth in claim 10;

wherein said power supply includes visual numerical terminal voltage readout means;

a source of power for energizing said readout means;

power interruption means connected between said source of power and said readout means;

and means responsive to detected abnormal operating conditions of said power supply for operating said power interruption means to extinguish said visual readout means.